United States Patent Office 3,420,794
Patented Jan. 7, 1969

3,420,794
PROCESS FOR CURING POLYEPOXIDES WITH A POLYAMINE AND RESULTING PRODUCTS
Clayton A. May, Orinda, Calif., and Charles T. Badenhop, Bound Brook, N.J., assignors to Shell Oil Company, New York, N.Y., a corporation of Delaware
No Drawing. Filed Aug. 29, 1963, Ser. No. 305,508
U.S. Cl. 260—47                                   11 Claims
Int. Cl. C08g 30/14

ABSTRACT OF THE DISCLOSURE

A process for preparing resinified products is disclosed. This process comprises simultaneously mixing a polyepoxide, a polyamine (e.g., diethylene triamine) and a special activator which is an organic compound possessing a carbon atom attached to at least three different nitrogen atoms and having at least one hydrogen atom attached to one of the nitrogen atoms (e.g., dicyandiamide).

---

This invention relates to the cure of polyepoxides with amines and to the resulting products. More particularly, the invention relates to the cure of polyepoxides with amines using a special type of accelerator, and to the resulting cured products.

Specifically, the invention provides a new process for curing and resinifying polyepoxides containing a plurality of vic-epoxy groups, and preferably a glycidyl polyether of a polyhydric phenol, with polyamines which brings about a more rapid cure at moderate temperatures. The process comprises mixing and reacting the polyepoxide with a polyamine, and preferably an aliphatic or cycloaliphatic polyamine, in the presence of a special accelerator comprising an organic compound having a carbon atom attached to at least three different nitrogen atoms (one nitrogen atom of which may be replaced by sulfur) and having at least one hydrogen attached to one of the nitrogen atoms, and preferably dicyandiamide. The invention further provides cured products obtained by the above-described process.

As a special embodiment, the invention further provides a process for utilizing the above-described new catalyst system in the prepartion of quick-setting adhesives, particularly for the bonding of metal-to-metal, glass-to-glass, metal-to-glass, and the like, the adhesives being particularly suited for use in the manufacture of television tubes as described hereinafter.

As a further special embodiment, the invention further provides a process for utilizing the above-described new catalysts in the preparation of stable prepolymers of the polyepoxides, such as, for example, in the formation of molding powders, which can be quickly converted on the application of heat and/or pressure to form crosslinked tough molded products.

As still a further special embodiment, the invention provides a method for using the new curing systems in making foamed products.

It is known that polyepoxides can be converted to insoluble infusible products by reaction with a polyamine. This type of curing agent, however, is not particularly suited for certain applications, such as in the preparation of quick setting adhesives, where the composition must set up in a matter of minutes. For example, such an adhesive is needed in the manufacture of television tubes by techniques, such as the Kimcode process wherein glass cloth is bonded to the funnel of the tube and a metal rim bond is bonded to the tube as noted hereinafter. In these applications, the adhesive must form a strong bond which must cure within a matter of minutes. Known curing systems suitable for this application are unable to effect the necessary cure within the desired short period of time at moderate temperatures.

It is, therefore, an object of the invention to provide a new process for curing polyepoxides. It is a further object to provide a process for curing polyepoxides with amine curing agents which takes place at a rapid rate. It is a further object to provide a new type of accelerator for amine cures of epoxy resins. It is a further object to provide a new process for curing polyepoxides at a rapid rate at moderate temperatures. It is a further object to provide new curing agent systems comprising a stable homogeneous blend of dicyandiamide dissolved in a polyamine. It is a further object to provide new adhesive compositions for use in the manufacture of TV tubes. It is a further object to provide new quick-setting adhesives for bonding metals, glass and the like. It is a further object to provide a process for making stable prepolymers that may be used in the preparation of molding powders and the like. It is a further object to provide a process for making compositions useful for making foamed or cellular materials. These and other objects of the invention will be apparent from the following detailed description thereof.

It has now been discovered that these and other objects may be accomplished by the process of the invention comprising mixing and reacting the polyepoxide with a polyamine, and preferably an aliphatic or cycloaliphatic polyamine, in the presence of a special accelerator comprising dicyandiamide. It has been surprisingly found that this special combination of materials brings about a very rapid cure of epoxy resins at moderate temperatures to form the desired insoluble infusible product. Adhesives containing the polyamine and dicyandiamide are, for example, able to be cured in from about ⅓ to ½ the time normally required for the polyamine cures. Such rapid rates make the composition ideal for use as quick setting adhesives for bonding glass cloth and rim bonds to television tubes. Such rapid rate of cure is also useful in the preparation of foamed articles and in the preparation of stable prepolymers as described hereinafter.

The above process is particularly useful for aromatic polyamines because in that case it permits one to use smaller amounts of aromatic amine and still obtain superior strength and heat resistance.

The above-noted discovery was quite unexpected in view of the fact that many of these special activators, such as dicyandiamide, exert little if any activity toward the polyepoxides under the conventional amine curing conditions, yet in combination with the polyamines demonstrates surprising activity. The combination thus gives true unexpected synergistic action as demonstrated in the examples at the end of the specification.

The polyepoxides to be used by the new process of the invention comprise those materials possessing more than one and preferably at least two vicinal epoxy groups, i.e.,

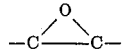

groups. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expersion is described in U.S. 2,633,458. The polyepoxides used in the present process are those having an epoxy equivalency greater than 1.0.

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticia, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,2-dicarboxylate, di(4,5-epoxyoctadecyl) malonate.

Another group of the epoxy-containing materials includes those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate,
dibutyl 7,8,11,12-diepoxyoctadecanedioate,
dioctyl 10,11-diethyl-8,9,12,13-diepoxyeicosanedioate,
dihexyl 6,7,10,11-diepoxyhexadecanedioate,
didecyl 9-epoxy-ethyl-10,11-epoxyoctadecanedioate,
dibutyl 3-butyl-3,4,5,6-diepoxycyclohexane-1,2-dicarboxylate,
dicyclohexyl 3,4,5,6-diepoxycyclohexane-1,2-dicarboxylate,
dibenzyl 1,2,4,5-diepoxycyclohexane-1,2-dicarboxylate and
diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers, butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type.

The polyamines to be used as the curing agent include those organic materials possessing a plurality of amino hydrogen, i.e., a plurality of

groups wherein N is an amino nitrogen. These include the aliphatic, cycloaliphatic, aromatic or heterocyclic polyamines as well as derivatives thereof as long as the derivatives still contain the necessary amino hydrogen.

Examples of these materials include, among others, the aliphatic polyamines, such as, for example, ethylenediamine,
diethylenetriamine,
triethylenetetramine,
tetraethylenepentamine,
1,4-aminobutane,
1,3-diaminobutane,
hexametylenediamine,
3-(N-isopropylamino)propylamine,
N,N'-diethyl-1,3-propanediamine,
hexapropyleneheptamine,
penta(1-methyl-propylene)hexamine,
tetrabutylenepentamine,
hexa(1,1-dimethylethylene)heptamine,
di(1-methylbutylene)triamine,
pentaamylhexamine,
tri(1,2,2-trimethylethylene)tetramine,
tetra(1,3-dimethylpropylene)pentamine,
penta(1,5-dimethylamylene)hexamine,
penta-(1,2-dimethyl-1-isopropylethylene)hexamine and
N,N'-dibutyl-1,6-hexanediamine.

Aliphatic polyamines coming under special consideration are the alkylene polyamines of the formula

wherein R is an alkylene radical, or a hydrocarbon-substituted alkylene radical, and $n$ is an integer of at least one, there being no upper limit to the number of alkylene groups in the molecule.

Especially preferred aliphatic polyamines comprise the polyethylene polyamines of the formula

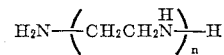

wherein $n$ is an integer varying from about 2 to 8. Coming under special consideration are the polyethylene polyamines comprising 20–80% by weight of polyethylene polyamines having average molecular weights in the range of 200–500. These high molecular weight polyethylene polyamines normally start with tetraethylene pentamine and having related higher polymers which increase in complexity with increasing molecular weights. The remaining 80–20% of the mixture is diethylene triamine employed in such proportions that the mixture is fluid at about room temperature (60–90° F.).

The mixture of high molecular weight polyethylene polyamines is normally obtained as a bottom product in the process for the preparation of ethylene diamine. Consequently, it normally constitutes a highly complex mixture and even may include small amounts (less than about 3% by weight) of oxygenated materials. A typical mixture of polyethylene polyamines diluted with about 25% diethylene triamine has the following analysis:

| | Percent by wt. |
|---|---|
| Carbon | 51.5 |
| Nitrogen | 34.3 |
| Hydrogen | 11.6 |
| Oxygen | 2.5 | total basicity, equivalents per 100 grams=1.98, equivalent to 27.7% nitrogen.

Active nitrogen _____ percent__ 81
Viscosity _____ poises__ 75–250
Equivalent weight _____ percent___ 42.5 to 47.5

Other examples include the polyamines possessing a cycloaliphatic ring or rings, such as, for example, 1-cyclohexylamino-3-aminopropane,
1,4-diaminocyclohexane,
1,3-diaminocyclopentane,
di(aminocyclohexyl)methane,
di(aminocyclohexyl)sulfone,
1,3-di(aminocyclohexyl)propane,
4-isopropyl-1,2-diaminocyclohexane,
2,4-diaminocyclohexane,
N,N'-diethyl-1,4-diaminocyclohexane, and the like.

Preferred members of this group comprise those polyamines having at least one amino or alkyl-substituted amino group attached directly to a cycloaliphatic ring containing 5 to 7 carbon atoms. The 6 membered cycloaliphatic amines are preferably obtained by hydrogenating the corresponding aromatic amine. Thus di(aminocyclohexyl)methane is obtained by hydrogenating methylene dianiline.

Another group of materials that may be used in the process of the invention comprise the organo-metallic compounds, such as those having a silicon or boron atom or atoms linked to amino or substituted amino groups. The compounds may also be those organo-metallic compounds wherein the amino group or substituted amino group or groups are attached to carbon, as in the alkoxysilylpropylamines as triethoxysilylpropylamines.

Still another group comprises the aminoalkyl-substituted aromatic compounds, such, as for example, di(aminoethyl) benzene, di(aminomethyl)benzene, tri(aminoethyl)benzene, tri(aminobutyl)naphthalene and the like.

Still another group comprises the polymeric polyamines, such as may be obtained by polymerizing or copolymerizing unsaturated amines, such as allyl amine or diallyl amine, alone or with other ethylenically unsaturated compounds. Alternatively, such polymeric products may also be obtained by forming polymers or copolymers having groups reactive with amines, such as, for example, aldehyde groups, as present on acrolein and methacrolein polymers, and reacting these materials with monomeric amines to form the new polymeric polyamines. Still other polymeric amines can be formed by preparing polymers containing ester groups, such as, for example, a copolymer of octadecene-1 and methyl acrylate, and then reacting this with a polyamine so as to effect an exchange of an ester group for an amide group and leave the other amine group or groups free. Polymers of this type are described in U.S. 2,912,416.

Still other materials include the N-(aminoalkyl)piperazines, such as, for example, N-aminobutylpiperazine, N - aminoisopropyl - 3 - butoxypiperazine, N-aminoethylpiperazine, 2,5-dibutyl - N - aminoethylpiperazine, 2,5-dioctyl-N-aminoisobutylpiperazine and the like. Coming under special consideration are the N-(aminoalkyl)piperazines wherein the alkyl group in the aminoalkyl portion of the molecule contains no more than 6 carbon atoms, and the total molecule contains no more than 18 carbon atoms.

Another group includes the acetone soluble products obtained by reacting the above-described polyamines with a monoepoxide. Examples of these reactants include, among others, ethylene oxide, propylene oxide, styrene oxide, phenyl glycidyl ether, allyl glycidyl ether, octadecyl glycidyl ether, tolyl glycidyl ether, chlorophenyl glycidyl ether, naphthyl glycidyl ether, diacetate of monoglycidyl ether of glycerol, dipropionate of the monoglycidyl ether of glycerol, epichlorohydrin, 1,2-decylene oxide, glycidyl acetate, glycidyl benzoate, glycidyl propionate, glycidyl acrylate, glycidyl methyl maleate, glycidyl stearate, glycidyl oleate, butyl 1,2-epoxypropionate and the like.

This reaction between the polyamines and monoepoxide is effected by merely bringing the components together in proper proportions. The adducts are obtained when a mole of the polyamine is reacted with not more than one mole of monoepoxide. The excess amine can be retained or removed by distillation. Examples of the monoepoxide-polyamine reaction products include, among others, N(hydroxypropyl) diethylenetriamine (reaction product of propylene oxide and diethylene triamine) and N(2-hydroxy - 3 - phenoxypropyl) diethylenetriamine (reaction product of phenyl glycidyl ether and diethylenetriamine).

A group of related materials are those soluble fusible products obtained by reacting a polyepoxide with a monoamine. Examples of polyepoxides that may be used include any of those noted above for use in the compositions of the present invention. Examples of the monoamines include any of those noted above for use in the compositions of the present invention. Examples of the monoamines include, among others, secondary amines as dimethylamine, diethylamine, dipropylamine, dibutylamine, di(tert-butyl)amine, dinonylamine, dicyclohexylamine, diallylamine, dibenzylamine, methylethylamine, ethylcyclohexylamine and the like. This reaction between the polyepoxides and monoamines is effected by merely bringing the components together in proper proportions. The desired soluble fusible products are obtained when the polyepoxide and monoamine are combined so as to have at least 1.5 moles of the amine per epoxide equivalent of the polyepoxide.

Other examples include the soluble reaction products of polyepoxides and polyamines, and salts thereof, such as described in U.S. 2,640,037 and U.S. 2,643,239.

Another group of derivatives that may be used in the process of the invention include those soluble and fusible products obtained by reacting the polyamines noted above with unsaturated nitriles, such as, acrylonitrile. Examples of such products include the cyanoethylated diethylenetriamine, cyanoethylated triethylenetetramine, cyanoethylated hexamethylenediamine, cyanoethylated 1,3-propanediamine and cyanoethylated 1,3-diaminocyclohexane. Preferred species of the cyanoalkylated polyamines include those of the formula

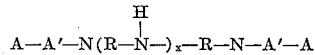

wherein $x$ represents an integer in the range of 0 through 3 and A and A' represent a member selected from the group consisting of hydrogen and cyanoethyl radicals, and further characterized in that the amine has at least one cyanoethyl group and at least one non-tertiary amino group in the molecule. Especially preferred members of this group comprise the cyanoethylated aliphatic and cycloaliphatic polyamines containing up to 18 carbon atoms.

Other suitable materials include the imidazoline compounds as prepared by reacting monocarboxylic acids with polyamines. These may be represented by the formula

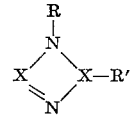

wherein X is an organic radical, and preferably an alkylene radical, R' is a long chain hydrocarbon radical, and preferably one containing at least 12 carbon atoms, and R is an organic radical containing an amine or amine substituted group. Particularly preferred members of this group are those obtained by reacting any of the above-described polyamines with long chain monocarboxylic acids, such as those containing at least 12 and preferably 16 to 30 carbon atoms, such as, for example, palmitic acid, pentadecanoic acid, 4-ketomyristic acid, 8,10-dibromostearic acid, margaric acid, stearic acid, alpha-chlorostearic acid, linoleic acid, oleic acid, dihydroxystearic acid, arachidic acid, cluopanodonic acid, behenic acid, lignoceric acid, cerotic acid, montanic acid, melissic acid, and the like, and mixtures thereof. These imidazolines are prepared by heating the polyamine with the monocarboxylic acid and removing the water formed by the reaction. The acid and polyamine are combined in an equivalent ratio varying from about .3 to .7 to 1, and preferably about .3 to .5 to 1. The temperature employed preferably varies from about 100° C. to 250° C.

Still other examples include the sulfur and/or phosphorus containing polyamines, such as may be obtained by reacting a mercaptan or phosphine containing active hydrogen with an epoxy halide to form a halohydrin, dehydrochlorinating and then reacting the resulting compound with a polyamine. N-(3-ethylthio-2-hydroxypropyl) diethylene triamine may be prepared, for example, by reacting ethyl mercaptan with epichlorohydrin, dehydrochlorinating and then reacting the resulting epoxy compound with diethylene triamine. Suitable examples of such compounds include, among others, N-(3-butylthio-2-hydroxypropyl)triethylene tetramine,
N-(4-phenylthio-3-hydroxybutyl) pentamethylene tetramine,
N-(4-cyclohexylthio-3-hydroxybutyl)ethylene diamine,
N-(3-cyclohexylthio-2-hydroxypropyl)hexamethylene diamine,
N-(3-diphenylphosphino-2-hydroxypropyl)triethylene tetramine,
N-(3-dicyclohexylphosphino-2-hydroxypropyl)pentamethylene tetramine,
N-(3-didodecylphosphino-2-hydroxyhexyl)diethylene triamine, and
N-3-(allylthio-2-hydroxypropyl)hexamethylene diamine.

Coming under special consideration are the N-(allylthiohydroxyallyl) aliphatic and aromatic polyamines, the N-(cycloalkylthiohydroxyalkyl) aliphatic and aromatic polyamines and the N-(arylthiohydroxyalkyl) aliphatic and aromatic polyamines. Preferred phosphorus-containing curing agents include the N-(dialkylphosphinohydroxyalkyl) aliphatic and aromatic polyamines, the N-(dicycloalkyl)phosphinohydroxyalkyl) aliphatic and aromatic polyamines and the N-(diarylphosphinohydroxyalkyl) aliphatic and aromatic polyamines.

Still other derivatives that may be employed include those obtained by reacting the polyamines with acrylates, such as methyl acrylate, ethyl acrylate, methyl methacrylates and the like. In this case there is an exchange of the ester linkage for an amide linkage, one of the polyamine nitrogen being involved in the said amide linkage.

Coming under special consideration, especially because of the superior rates of cure obtained therewith are the polyamines of the formula

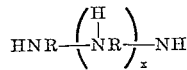

wherein $x$ is an integer of 0 to 10 and R is a bivalent aliphatic or cycloaliphatic hydrocarbon radical containing from 1 to 10 carbon atoms, and derivatives obtained by reacting the aforedescribed polyamines with monoepoxides containing from 2 to 10 carbon atoms, ethylenically unsaturated mononitriles containing 1 to 6 carbon atoms and monocarboxylic acids containing up to 20 carbon atoms.

Also coming under special consideration particularly because of the excellent strengths obtained with less curing agent are the aromatic polyamines and especially those having at least two —NH$_2$ groups attached to aromatic ring or rings and containing up to 25 carbon atoms.

The activator to be employed with the above-described polyamines include those organic compounds having a carbon atom attached to at least three different nitrogen atoms (one nitrogen atom of which may be replaced by sulfur), and having at least one hydrogen attached to one of the nitrogen atoms. While dicyandiamide is by far the more preferred compound to be employed because of the superior results obtained therewith other compounds of this type may be used. Included within this group are thioammeline, dithiobiuret, ethylenethiourea, diallylmelamine, acetoquanamine, melamine, guanylurea, benzoquanamine, benzoyldicyandiamide, guanazole, 3-amino-1,2,4-triazole, monomethyloldicyandiamide, thiosemicarbazide, triaminomelamine, phenylbiguanide, guandine and the like. Preferred compounds are dicyandiamide and substituted dicyandiamides, e.g., compounds of the formula

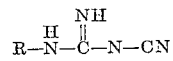

wherein R is an organic radical such as a hydrocarbon radical or a nitrogen-, ether-, ketone-, halogen-, OH—, etc. substituted hydrocarbon radical. Also preferred are those of the formula

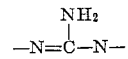

wherein the free bonds are attached to organic radicals as noted above which may be open chain or contained in a cyclic structure.

The amount of the polyamine curing agent to be employed in the process of the invention may vary within certain limits. In general, the polyepoxide is combined with at least .8 equivalent of the polyamine. As used herein, "equivalent" amount refers to that amount needed to furnish one amino hydrogen per epoxy group to be reacted. Preferably the polyepoxide and polyamine are combined in chemical equivalent ratios varying from .8:1.5 to 1.5:0.8. Aliphatic and cycloaliphatic amines are preferably used in approximately equivalent amounts and the aromatic amines are preefrably used in amount of .8 to 1 equivalent amounts.

The amount of the accelerator may also vary within certain limits. The superior results are obtained when the amount of activator varies from about .1 to 12 parts per 100 parts of polyepoxide, and preferably from 3 to 6 parts per 100 parts of polyepoxide.

In operating the process of the invention, one merely mixes the polyepoxide, polyamine and activator together in the above-noted proportions and utilizes the resulting mixture in the desired application. The order of mixing may be varied as desired. It is generally preferred to mix the polyamine and dicyandiamine together as by mixing the dicyandiamine in the polyamine to form a stable curing agent combination and then as desired combining this mixture with the polyepoxide. It is also proper in some cases to first mix the dicyandiamide with the polyepoxide and then combine this with the polyamine.

The mixture of polyepoxide, polyamine and accelerator is preferably employed in a mobile condition. If the component or components are thick liquids or solid, this may be accomplished by heating the mixture or by use of diluents or solvents. Various solvents or diluents may be employed. These may be volatile solvents which escape from the polyepoxide compositions by evaporation before or during the cure such as esters as ethyl acetate, butyl acetate, Cellosolve acetate (acetate of ethylene glycol monoethyl ether), methyl Cellosolve acetate (acetate of ethylene glycol monomethyl ether), etc., ether alcohols, such as methyl, ethyl or butyl ether of ethylene glycol or diethylene glycol; chlorinated hydrocarbons such as trichloropropane, chloroform, etc. To save expense, these active solvents may be used in admixture with aromatic hydrocarbons such as benzene, toluene, xylene, etc. and/or alcohols such as ethyl, isopropyl or n-butyl alcohol. Solvents which remain in the cured compositions may also be used, such as diethyl phthalate, dibutyl phthalate and the like, as well as cyanosubstituted hydrocarbons, such as acetonitrile, propionitrile, adiponitrile, benzonitrile, and the like. It is also convenient to employ a polyepoxide, such as one of the glycidyl polyethers of polyhydric phenols in admixture with a normally liquid glycidyl polyether of a polyhydric alcohol. In fact, two or more of any of the polyepoxides may be used together as mixtures. In such a case, the amount of the adduct added and commingled is based on the average epoxide equivalent weight of the polyepoxide mixture.

Other types of materials may also be included in the composition, such as fillers, as aluminum powder, asbestos, powdered mica, zinc dust, bentonite, ground glass fibers, Moneeta clay and the like, stabilizers, plasticizers, insecticides, fungicides, extenders, such as alkylated phenols as dinonyl phenol, coal tars, asphalts, road oils, extracts and distillates, middle oil, refined coal tar, pine tars, and the like, as well as other types of resins as phenolaldehyde resins, phenol-urea resins, polythiopolymercaptans, vinyl resins, polyolefins, synthetic rubbers, and the like, and mixtures thereof, and solid particles, such as particles of nylons, rayons, Dacrons, and the like. These and other materials are preferably employed in amounts less than 60% by weight of the polyepoxide, and more preferably not more than 50% by weight of the polyepoxide.

Other types of curing agents and activators, such as anhydrides, $BF_3$-complexes, polyhydric phenols, mercaptans and the like may also be included with the compositions.

As noted above, the polyepoxide compositions, and preferably those containing the aliphatic and cycloaliphatic polyamines, can be cured at the low reaction temperatures, e.g., around embient temperature, with a preferred range varying from about 10° C. to 60° C. However, in some cases, it may be desired to apply some heat to increase the rate of cure. Suitable temperatures in this case generally vary from about 50° C. to about 150° C. If the composition contains an aromatic amine, it is generally preferred to employ heat in effecting the cure. Preferred tempeatures for the aromatic amines vary from about 60° C. to about 250° C.

The above process may be utilized in many important commercial applications. The process may be used, for example, in the formation of surface coatings, and particularly those requiring rapid cures as for non-skid highway coatings, coating of load areas, storage areas, factory floors, storage tanks and the like, as well as many conventional applications, such as painting of ships, automobile parts, etc. The coatings possess superior mar resistance.

The above process is also applicable in lamination and filament winding applications. In this latter application, the filaments, such as, for example, glass fibers are passed into and through the solution containing the polyepoxide, polyamine and accelerator, and then wound onto the desired mandrel or form. The resulting product can be cured in conventional manner.

The above-desired systems are also useful in the preparation of laminated sheet materials. In this application, the sheets of fibrous material are impregnated with the mixture of polyepoxide, polyamine and accelerator. The impregnation is preferably accomplished by spreading the liquid mixture containing the above-noted components onto the sheet material as by dipping or otherwise immersing the sheets in the impregnant. The solvent is conveniently removed by evaporation and the mixture is cured to the fusible resin stage. The resinification can be arrested by cooling or other means. A plurality of the impregnated sheets are then superposed and the assembly is cured in a heated press under a pressure of about 25 to 500 or more pounds per square inch. The resulting laminate is extremely strong and resistant to the action of organic and corrosive solvents. The fibrous material used in the preparation of the laminates may be of any suitable material, such as glass cloth and matting, canvas and the like. It is usually preferred to utilize woven glass cloth that has been given pior treatment with well known finishing or sizing agents, therefore, such as methacrylate chronic chloride or vinyl trichlorosilane.

Because of the rapid rate of cure, the above-described systems can be used in the preparation of foamed materials where rapid rates of cure are essential for applications such as foamed in place operations and the like. The resulting foamed products are characterized by having uniform cell structure and low densities. In this application, the mixture of polyepoxide, polyamine and accelerator are mixed with a blowing or foaming agent and the mixture is then poured out into the place where the foam is to be formed and the foam allowed to set. Suitable foaming agents preferably have a normal boiling point near or below ambient temperature, and still more preferably between about 0° C. and 40° C. Examples of suitable foaming agents include, among others, the chlorofluoroalkanes known as "Freons," such as $CCl_3F$, $CHCl_2F$, and $CClF_2$—$CClF_2$.

The process of the invention is particularly suited for use as quick-setting adhesives for bonding various types of materials together in a short period. The compositions may be used for bonding materials, such as glass-to-glass, metal-to-metal, glass-to-metal, wood-to-wood, and the like. They are particularly valuable as adhesives for bonding glass cloth to glass and metal-to-glass as described hereinafter. When applied to the desired surfaces to form films of various thicknesses, e.g., 5 mils to 30 mils and then the other surface superimposed and heat and/or pressure applied. The two surfaces may also be placed in a fixed position relative to each other and the adhesive forced between the surfaces and then pressure applied.

As noted above, the compositions formed by the new process are particularly useful as adhesives for TV tube manufacture, such as by the Kimcode process. In this process at one point glass cloth is bonded to the funnel portion of the tube, and at another point a rim band holding the front plate is bonded to the glass cloth. The new adhesives of the present invention are ideally suited for both applications as they form strong bonds to the glass or glass cloth and metal and cure within the short time alloted for these operations on the customary assembly line. In these operations, it is generally preferred to apply the glass cloth dry, spray on the adhesive, heat cure at temperatures preferably ranging from about 40° C. to 125° C. The adhesive containing the polyepoxide, polyamine and special additive is then applied over the cloth as a thin coating, the rim band placed in position, slight pressure applied and then the adhesive allowed to cure.

The compositions are also of value as adhesives for metal-to-metal bonding. In this case, it has been found advantageous to impregnate cotton, rayon, synthetic fiber or glass cloth textiles with the composition, and then use the impregnated textiles as a bonding tape for joining the metals. Such tapes provide convenient means for handling and using the compositions in adhesive applications. The tape is inserted between two metals to be joined, and the assembly is then preferably heated to speed the cure of the resin. A preferred tape for such use has a glass fiber textile impregnated with a mixture containing the polyepoxide, polyamine, activator and aluminum powder or dust filler.

The process of the invention is also suitable for use in making stable prepolymers of the polyepoxides for use in forming molding powders and the like. In this application one preferably uses a smaller amount of the polyamine, e.g., $\frac{1}{10}$ to $\frac{1}{2}$ the stoichiometric amount, so as to effect mainly linear type polymerization for the prepolymer type product. This solid product may then be converted to a powder and used as in the desired molding operations using heat and pressure. Under these conditions, the dicyandiamide acts to effect the necessary cross-linking to form the desired insoluble, infusible product.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts described in the examples are parts by weight. The polyethers referred to by letters in the examples are those described in U.S. 2,633,458.

EXAMPLE I

This example illustrates the use of the process of the invention in curing Polyether A and the use of the composition as an adhesive for bonding glass cloth and rim bonds to a TV tube.

36 parts of the dicyandiamide was mixed with 100 parts of diethylenetriamine. 16 parts of this mixture was combined with 5 parts of furfuryl alcohol and 1 part of an amine-silane compound.

22 parts of the above-noted mixture was combined with 100 parts of a polyepoxide composition made up of 72.5 parts of Polyether A containing small amounts of butyl glycidyl ether, 21.75 parts of dinonyl phenol and 5.8 parts of 2,2-bis(4-hydroxyphenyl)propane.

The above-noted combined mixture was used as an adhesive for adhering glass cloth to TV tubes. This was done first by draping the glass cloth over the tube and then spraying the combined mixture over the glass cloth. Thin films of this adhesive cured within 7 minutes at 150° F. as compared to 20 minutes at 200° F. for a similar system wherein the dicyandiamide was omitted. A similar system containing only dicyandiamide as the curing agent would not cure at these temperatures.

Other portions of the above-noted adhesive compositions were prepared with the exception that the amount of curing agent containing the diethylenetriamine and dicyandiamide was varied from 10 to 26 parts. This mixture was used to make ⅛ inch castings. The products cured rapidly at room temperature to form highly cross-linked insoluble flexible products. Some of the properties are shown below:

| Amount of curing agent (parts per hundred) | Tensile strength, p.s.i. | Elongation percent, |
| --- | --- | --- |
| 18 | 6,000 | 7 |
| 22 | 3,500 | 30 |
| 26 | 2,000 | 122 |

EXAMPLE II

Castings were prepared by reacting the curing agent prepared in Example I with Polyether A in the proportions shown in the table below. ⅛ inch castings were prepared and cured for 7 days at room temperature. The tensile strength and elongation of the resulting castings are shown in the table:

| Curing agent, parts per hundred of polyether A | Tensile strength, p.s.i. | Elongation, percent |
| --- | --- | --- |
| 10 | 9,700 | 4 |
| 13 | 12,900 | 4 |
| 16 | 13,700 | 8 |
| 19 | 12,600 | 8 |

The heat deflection temperature of the castings made with 13 parts of the curing agent and cured for 1 hour at 200° F. is 128° C. to 130° C.

EXAMPLE III

This example illustrates the use of the process of the invention in preparing stable prepolymers.

A curing agent was prepared by mixing 36 parts of dicyandiamide with 100 parts of N-aminoethylpiperazine. 13.5 parts of this mixture was combined with 100 parts of Polyether A. The mixture was cured in thin sections (less than ¼ inch). This yielded a brittle material which was ground to form a powder. The addition of heat and pressure caused this powder to fuse together and cure to form a highly cross-linked tough material. A heat deflection temperature of 118° C. was obtained when cured 1 hour at 200° C. This material was still moldable two months after preparation.

EXAMPLE IV

This example illustrates the use of the process of the invention in preparing a foamed product.

A polyepoxide composition was prepared by mixing 9.5 parts of Polyether A, 66.5 parts of Polyether B and 2.8 parts of a diglycidyl ester of dimerized linoleic acid and 16.2 parts of Freon 11 (monofluorotrichloromethane). To this mixture was added the approximate stoichiometric amount (12 parts) of curing agent prepared in Example I. This mixture was poured into a mold to form a tough uniform foam.

EXAMPLE V

Example IV was repeated with the exception that the curing agent used was that shown in Example III. Related results are obtained.

EXAMPLE VI 100 parts of the curing agent prepared in Example I was combined with 100 parts of N-aminoethylpiperazine, 90 parts of 2,2-bis(4-hydroxyphenyl)propane. 12 parts of this was combined with 100 parts of a polyepoxide composition made up of 9.5 parts of Polyether A, 66.5 parts Polyether B, and 2.8 parts of diglycidyl ester of dimerized linoleic acid and 16.2 parts of Freon 11. This mixture was poured out to form a tough foam. The initiating time was 6 minutes. With 15 parts of the curing agent, the initiation time was two minutes.

EXAMPLE VII

A paste was prepared by grinding solid dicyandiamide into Polyether A to form a 50:50 mixture. 12 parts of this mixture was combined with 94 parts of Polyether A, 10 parts of triphenyl phosphite, 35 parts of asbestos floats and 10.7 parts of diethylenetriamine. This mixture had a pot life of 15 minutes as compared to 22 minutes for one without the dicyandiamide. One containing the dicyandiamide as sole curing agent had an indefinite pot life. This mixture was used to bond sheets of aluminum metal together. After 7 days cure at room temperature, the bond had a strength of 2264 p.s.i. as compared to one of 1780 p.s.i. for the adhesive containing only the diethylenetriamine as curing agent.

EXAMPLE VIII

A new paste adhesive was prepared by mixing the following: 12 parts of a mixture of dicyandiamide and Polyether A (50:50 mixture), with 44 parts of Polyether A, 50 parts of triphenyl phosphite, 10 parts of asbestos floats, and 4 parts of polyvinyl alcohol and 10.8 parts of diethylene triamine. This mixture had a pot life of 33 minutes as compared to 97 minutes for a similar one without the dicyandiamide. The mixture was used to form a strong bond between aluminum sheets as noted in the preceding example.

EXAMPLE IX

A paste adhesive was prepared by mixing 100 parts of Polyether B with 10 parts of butyl glycidyl ether, 35 parts of asbestos, 12 parts of the mixture of dicyandiamide and Polyether A (50:50) and 10.1 parts of diethylenetriamine. The pot life of this composition was much shorter than that of a similar composition without the dicyandiamide. This mixture was used to bond aluminum strips together as in the preceding example. The bond was cured at room temperature for several days. The resulting assembly had very good tensile shear strength.

EXAMPLE X

A composition was prepared by mixing 15.5 parts of a curing agent comprising an adduct of meta-phenylene diamine and phenyl glycidyl ether with 6 parts of dicyandiamide and 100 parts of Polyether A. Castings prepared from this mixture and cured at 100° C. possessed excellent strength and elongation.

EXAMPLE XI

Examples I to X are repeated using melamine in place of dicyandiamide. An accelerating effect was obtained.

EXAMPLE XII

Examples I to X are repeated using each of the following accelerators: benzoyldicyandiamide, diallylmelamine, acetoguanamine and monomethyloldicyandiamide. Related results are obtained.

We claim as our invention:

1. A process for curing a polyepoxide having more than one vic-epoxy group which comprises mixing and reacting the polyepoxide with at least .8 equivalent of an organic polyamine containing at least three hydrogen attached to amino nitrogen, in the presence of an activating amount of dicyandiamide.

2. A process as in claim 1 wherein the polyamine is an aliphatic polyamine containing up to 25 carbon atoms.

3. A process as in claim 1 wherein the polyamine is a cycloaliphatic polyamine containing up to 20 carbon atoms.

4. A process as in claim 1 wherein the polyamine is a polyalkylene polyamine.

5. A process as in claim 1 wherein the polyamine is diethylenetriamine.

6. A process as in claim 1 wherein the polyamine is N-amino-ethylpiperazine.

7. A process as in claim 1 wherein the polyepoxide is a glycidyl polyether of a polyhydric compound of the group consisting of polyhydric alcohols and polyhydric phenols.

8. A process as in claim 1 wherein the polyepoxide is a glycidyl polyether of 2,2-bis(4-hydroxyphenyl)propane having a molecular weight of between 250 and 900.

9. A process for curing a glycidyl polyether of a polyhydric phenol which comprises mixing and reacting the glycidyl polyether with from .8 to 2.5 equivalents of an aliphatic polyamine possessing a plurality of amino hydrogen containing up to 20 carbon atoms in the presence of 0.1 to 12 parts per 100 parts of glycidyl polyether of dicyandiamide.

10. A stable prepolymer obtained by simultaneously mixing a polyepoxide having more than one vic-epoxy group, less than a stoichiometric amount of a polyamine possessing a plurality of amino hydrogen, and .1 to 12 parts of a special activator comprising a member of the group consisting of dicyandiamide, thioammeline, dithiobiuret, ethylenethiourea, diallylmelamine, acetoquanamine, melamine, guanylurea, benzoquanamine, benzoyldicyandiamide, guanazole, 3-amino-1,2,4-triazole, monoethylol-dicyandiamide, thiosemicarbazide, triaminomelamine, phenylbiguanide, and guandine, and reacting this mixture at a temperature below 50° C.

11. A process for preparing a resinified product which comprises simultaneously mixing a polyepoxide having more than one vic-epoxy group, a polyamine possessing a plurality of amino hydrogen and a special activator comprising a member of the group consisting of dicyandiamide, thioammeline, dithiobiuret, ethylene thiourea, diallylmelamine, acetoquanamine, melamine, guanylurea, benzoquanamine, benzoyldicyandiamide, guanazole, 3-amino-1,2,4-triazole, monoethylol-dicyandiamide, thiosemicarbazide, triaminomelamine, phenylbiguanide, and guandine and allowing the mixture to cure.

References Cited

UNITED STATES PATENTS 2,682,490   6/1954   Gams et al.

WILLIAM H. SHORT, *Primary Examiner.*

T. D. KERWIN, *Assistant Examiner.*

U.S. Cl. X.R.

156—330; 161—184, 185, 186; 260—2, 2.5, 28, 37, 78.4, 79, 83.3, 85.1, 94.7, 404.5, 830, 831, 834, 837